US009464519B2

United States Patent
Liu et al.

(10) Patent No.: US 9,464,519 B2
(45) Date of Patent: Oct. 11, 2016

(54) METHOD AND APPARATUS FOR DETECTING GAMMA RADIATION DOWNHOLE

(71) Applicant: Evolution Engineering Inc., Calgary, Alberta (CA)

(72) Inventors: Jili Liu, Calgary (CA); Aaron W. Logan, Calgary (CA); David A. Switzer, Calgary (CA); Mojtaba Kazemi Miraki, Calgary (CA)

(73) Assignee: Evolution Engineering, Inc., Calgary, Alberta (CA)

( * ) Notice: Subject to any disclaimer, the term of this patent is extended or adjusted under 35 U.S.C. 154(b) by 0 days.

(21) Appl. No.: 14/896,341

(22) PCT Filed: May 29, 2014

(86) PCT No.: PCT/CA2014/050503
§ 371 (c)(1),
(2) Date: Dec. 4, 2015

(87) PCT Pub. No.: WO2014/194418
PCT Pub. Date: Dec. 11, 2014

(65) Prior Publication Data
US 2016/0123137 A1   May 5, 2016

Related U.S. Application Data

(60) Provisional application No. 61/830,772, filed on Jun. 4, 2013.

(51) Int. Cl.
*G01V 5/06*         (2006.01)
*E21B 47/09*        (2012.01)
(Continued)

(52) U.S. Cl.
CPC ............ *E21B 47/09* (2013.01); *E21B 7/04* (2013.01); *E21B 7/06* (2013.01); *E21B 47/00* (2013.01);
(Continued)

(58) Field of Classification Search
CPC ......... G01V 5/06; E21B 47/09; E21B 47/12; E21B 47/00; E21B 47/022; E21B 47/024
See application file for complete search history.

(56) References Cited

U.S. PATENT DOCUMENTS 6,215,120 B1   4/2001   Gadeken et al.
7,114,565 B2   10/2006  Estes et al.
7,813,878 B2   10/2010  Estes et al.

FOREIGN PATENT DOCUMENTS

CA         2312742 A1   6/1999

*Primary Examiner* — David Porta
*Assistant Examiner* — Djura Malevic
(74) *Attorney, Agent, or Firm* — Stites & Harbison PLLC; Richard S. Myers, Jr.

(57) ABSTRACT

The embodiments described herein generally relate to a method for detecting gamma radiation downhole using a downhole probe assembly. The method includes rotating the downhole probe assembly and measuring gamma radiation passing through a window of a gamma sensor module and hitting a gamma sensor therebelow. A gyroscope output is sampled at predetermined time intervals to indicate the speed of rotation of the downhole probe assembly. The angle of rotation of the window is calculated based on the speed of rotation of the downhole probe assembly. Each revolution of the downhole probe assembly is conceptually divided up into a plurality of bins. Measured gamma radiation is allocated to one of the plurality of bins based on the calculated angle of rotation of the window to provide a real time indication of the direction and strength of gamma radiation emitted by the formation surrounding the borehole. This information can be used for real time geosteering of the drill bit during downhole drilling.

23 Claims, 8 Drawing Sheets

(51) Int. Cl.
*E21B 7/04* (2006.01)
*E21B 7/06* (2006.01)
*E21B 47/00* (2012.01)
*E21B 47/022* (2012.01)
*E21B 47/024* (2006.01)
*E21B 47/12* (2012.01)

(52) U.S. Cl.
CPC ............ *E21B 47/022* (2013.01); *E21B 47/024* (2013.01); *E21B 47/12* (2013.01); *G01V 5/06* (2013.01)

METHOD AND APPARATUS FOR DETECTING GAMMA RADIATION DOWNHOLE

CROSS REFERENCE TO RELATED APPLICATIONS

This application is a §371 National State Application of PCT/CA2014/050503 filed May 29, 2014 which claims priority to provisional application No. 61/830,772 filed Jun. 4, 2013.

FIELD

This disclosure relates generally to downhole drilling, such as measurement-while-drilling (MWD), and to a method and apparatus for detecting gamma radiation down hole.

BACKGROUND

The recovery of hydrocarbons from subterranean zones relies on the process of drilling wellbores. The process includes drilling equipment situated at surface and a drill string extending from the surface equipment to the formation or subterranean zone of interest. The drill string can extend thousands of meters below the surface. The terminal end of the drill string includes a drill bit for drilling (or extending) the wellbore. In addition to this conventional drilling equipment the system also relies on some sort of drilling fluid, which in most cases is a drilling "mud" which is pumped through the inside of the drill string. The drilling mud cools and lubricates the drill bit and then exits out of the drill bit and carries rock cuttings back to surface. The mud also helps control bottom hole pressure and prevents hydrocarbon influx from the formation into the wellbore, which can potentially cause a blow out at surface.

Directional drilling is the process of steering a well away from vertical to intersect a target endpoint or to follow a prescribed path. At the terminal end of the drill string is a bottom-hole-assembly ("BHA") which comprises 1) a drill bit; 2) a steerable downhole mud motor of rotary steerable system; 3) sensors of survey equipment (logging-while-drilling (LWD) and/or measurement-while-drilling (MWD)) to evaluate downhole conditions as well depth progresses; 4) equipment for telemetry of data to surface; and 5) other control mechanisms such as stabilizers or heavy weight drill collars. The BHA is conveyed into the wellbore by a metallic tubular.

As an example of a potential drilling activity, MWD equipment is used to provide downhole sensor and status information to surface in a near real-time mode while drilling. This information is used by the rig crew to make decisions about controlling and steering the well to optimize the drilling speed and trajectory based on numerous factors, including lease boundaries, locations of existing wells, formation properties, and hydrocarbon size and location. This can include making intentional deviations from an originally-planned wellbore path as necessary based on the information gathered from the downhole sensors during the drilling process. The ability to obtain real time data during MWD allows for a relatively more economical and more efficient drilling operation.

In both directional and straight (or vertical) holes, the position of the well must be known with reasonable accuracy to ensure the correct well trajectory. While extending the wellbore, evaluation of physical properties such as pressure, temperature and the wellbore trajectory in three-dimensional space are important. The measurements include inclination from vertical and azimuth (compass heading). Measurements are typically made at discrete points with the general path of the wellbore computed from these points. In downhole MWD, the MWD tool surveys the well as it is drilled and information regarding the orientation of the drill bit is relayed back to the driller on surface. Measurement devices typically include a series of accelerometers which measure the inclination of the tool (for example vertical is 0° inclination and horizontal is 90° inclination) and magnetometers which measure the earth's magnetic field to determine azimuth. A typical Directional and Inclination (D&I) sensor package consists of three single axis accelerometers in each of the three orthogonal axes, together with two dual axes magnetometers yielding the three orthogonal axes and one redundant axis, which is typically not used. The sensor package also includes associated data acquisition and processing circuitry. The accelerometers and magnetometers are arranged in three mutually orthogonal directions, and measure the three mutually orthogonal components of the Earth's magnetic field and Earth's gravity. The accelerometer consists of a quartz crystal suspended in an electromagnetic field; measuring the inclination by how much electromagnetic force is required to maintain the crystal in balance. The accelerometers provide measurement of deviation from vertical, or inclination, as well as providing a measurement of the toolface or rotational orientation of the tool. The magnetometers provide a measure of the direction or magnetic heading as well as its orientation when the BHA is at or near vertical. These sets of measurements combined assist the driller for steering as well as for computing location. In most cases, whenever another length of drill pipe is added to the drill string, a survey is taken and the information is sent to surface and decoded by the MWD tool operator and converted to information the driller requires for survey calculations. The BHA position is then calculated by assuming a certain trajectory between the surveying points.

Gyroscopes may also be used to help determine direction of the BHA and for identification or correlation of angular changes for particular formation parameters as measured. Similar to placement of accelerometers and magnetometers, there may be three gyroscopes oriented in the x, y and z orthogonal axes within a gyroscope unit. Unlike magnetometers, gyroscopes are not adversely affected by the presence of ferrous metals. Gyroscopes however, tend to be more complex and have time-dependent errors which require the gyroscopes to be re-referenced or calibrated after exposure to high temperature and vibration. Gyroscopes also tend not to give good toolface direction at low inclination.

U.S. Pat. No. 8,061,048, which is incorporated herein by reference, describes the use in open or cased holes, of three gyroscopes, at three angular orthogonal orientations to each other, used to determine the direction of north and then azimuth. U.S. Pat. No. 7,801,704 which is incorporated herein by reference, describes benefits of industry available MEMS gyro sensors which are cheap, light weight, shock reliable, high temperature resistant and have low offset error. Azimuthal measurements with gyroscopes are preferably conducted under stationary conditions. Instead of magnetic north, gyroscopes can relate azimuthal direction of borehole to true north. As described in U.S. Pat. No. 8,200,436 and U.S. Pat. No. 8,260,554 (incorporated herein by reference) gyroscopes combined with accelerometers can provide inertial tracking of tool position, particularly in situations where magnetic field is disrupted such as within or close to a metal casing. In U.S. Pat. No. 7,234,540 (incorporated herein by reference), two axes gyroscopes are used to determined toolface angle making use of inherent slight misalignment of one gyroscope and its resultant sensitivity to rotation about the third axis. In addition, temperature dependent errors are removed in the method of calibration by cross-sensitivity of the two gyroscopes about the third axis.

Known MWD tools contain essentially the same D&I sensor package to survey the well bore but the data may be sent back to surface by various telemetry methods. Such telemetry methods include, but are not limited to, the use of hardwired drill pipe, acoustic telemetry, fibre optic cable, Mud Pulse (MP) Telemetry and Electromagnetic (EM) Telemetry. In some downhole drilling operations there may be more than one telemetry system used to provide a backup system in case one of the wellbore telemetry systems fails or is otherwise unable to function properly. The sensors used in the MWD tools are usually located in an electronics probe or instrumentation assembly contained in a cylindrical cover or housing, located near the drill bit.

In directional drilling, the operator may utilize one or more horizontal well bores that branch from a single vertical well bore to utilize productive hydrocarbon deposits. The various formations being drilled through are composed of different layers of source material. In many cases, the driller and geologist rely on various formation parameters to help identify and verify that the drill bit is within or close to the zone of interest. One such parameter is gamma radiation which is naturally emitted by different isotopes, generally potassium, uranium and thorium. Gamma radiation emissions tend to be uniform within a particular zone and exhibit similar emission levels based on the type of source rock. For example, sandstones (which are generally hydrocarbon bearing) have low gamma radiation emission, whereas shale (which generally define sandstone bed boundaries) typically have a higher gamma radiation emission level. The variance in the gamma radiation emissions between these two types of rock can by used to help identify where the drill bit is positioned within a zone. For example, if the gamma radiation emissions begin to increase, the drill bit may be closer in proximity to a shale boundary and hence deviating away from the zone of interest.

Traditional gamma radiation counters use scintillation crystals and photomultiplier tubes disposed within pressure housing secured in a rotating portion of the drill string. The crystal reacts to the emitted gamma radiation, with the captured optical energy transferred to electrical energy through the electronics assembly, and the data is relayed to the telemetry system. Traditional gamma counters provide levels of detected emissions from the surrounding formation wellbore, but do not provide the angular location of the gamma radiation. It is beneficial for the driller to know directional aspects of gamma radiation to provide an indication of the proximity or closeness to upper and lower boundaries of formations. The driller will try to stay within a specific target or "pay area" of the zone of interest; even when the formation dips the driller will try to stay within the anticipated pay area as these are the most productive vertical meters within the formation.

More recently, directional information has been added to gamma radiation measurement with "focused gamma counters". This has been accomplished by installing the scintillation crystal in such as way as to limit the crystal's "window of exposure" to a defined angular open window in a shield housing placed around the crystal. The shield housing blocks or reduces capture of emitted radiation except for gamma radiation hitting the crystal through the open window as described in U.S. Pat. No. 6,300,624 and U.S. Pat. No. 6,944,548, both of which are incorporated herein by reference. The window is rotated as the drill string rotates, and gamma radiation measurements for the full 360 degree circumference around the borehole may be captured. Normally, gamma radiation measurements in a particular zone of interest are approximately azimuthally uniform because the pay area consists mostly of one material, such as sand. As the BHA nears a bed boundary, the focused gamma sensor will detect a variation in gamma radiation measurements, with the highest amplitude or counts being recorded when the open window faces the bed boundary. Typically in focused gamma, the measurements are taken while holding a specific toolface. Once gamma radiation measurements are taken, the tool is rotated to a new toolface position and then held there as a new set of measurements are taken, and repeated. In other focussed gamma counters, such as those described in U.S. Pat. No. 6,300,624, multiple gamma counters are placed in sondes each facing a different direction to capture the angular variation of the gamma radiation from the surrounding formation without having to rotate the detector.

In CA 2,367,023 (incorporated herein by reference), the microcontroller in the tool divides the circumference of the tool into a predetermined number of wedges and a gamma radiation count value is assigned for each wedge or sector. The x and y components of the gamma radiation counts for each sector are determined and averaged to obtain the average x and y components.

SUMMARY

According to one aspect of the invention, there is provided a method for detecting gamma radiation downhole using a downhole probe assembly. The downhole probe assembly comprises: a gamma sensor module comprising a shield housing and a gamma sensor enclosed within the shield housing, the shield housing including a window exposing the gamma sensor therebelow; a gyroscope fixedly mounted in a plane perpendicular to an axis of rotation of the downhole probe assembly; and a controller in electrical communication with the gamma sensor module and the gyroscope. The method comprises: rotating the downhole probe assembly; measuring gamma radiation passing through the window and hitting the gamma sensor therebelow; sampling gyroscope output at predetermined time intervals and determining speed of rotation of the downhole probe assembly for each sampled gyroscope output; calculating a gyro angle for each sampled gyroscope output by multiplying the determined speed of rotation of the downhole probe assembly by the predetermined time interval; calculating an angle of rotation of the window as an aggregate of the calculated gyro angles; and based on the calculated angle of rotation of the window allocating measured gamma radiation to one of a plurality of conceptual bins dividing each revolution of the downhole probe assembly.

The method may further comprise: recording the allocated measured gamma radiation for each of the plurality of bins for each revolution of the downhole probe assembly for a predetermined period; recording the time the window spends in each of the plurality of bins for each revolution for the predetermined period; and calculating average gamma radiation per unit of time for each of the plurality of bins for the predetermined period based on the allocated measured gamma radiation and the time the window spends in each of the plurality of bins for each revolution. The predetermined period may be a predetermined amount of time or a predetermined number of revolutions of the downhole probe assembly. Alternatively, the predetermined period may be a predetermined amount of time and a shifting average may be taken whereby the average gamma radiation calculated for a latest portion of time replaces the average gamma radiation calculated for an equivalent oldest portion of time.

The method may further comprise transmitting selected parameters regarding the calculated average gamma radiation for each of the plurality of bins for the predetermined period to the surface as telemetry data. The selected parameters may comprise data regarding a minimum bin having lowest average gamma radiation over the predetermined period and data regarding a maximum bin having highest average gamma radiation over the predetermined period. The selected parameters may further comprise a ratio between average gamma radiation of the maximum bin and average gamma radiation of the minimum bin. The method may further comprise monitoring the ratio and signalling when the ratio is outside a predetermined range.

The method may further comprise: during periodic surveys when there is no rotation of the downhole probe assembly taking survey magnetometer and accelerometer readings respectively from magnetometers and accelerometers positioned in the downhole probe assembly and configured to gather information relating to each of orthogonal axes X, Y and Z; calculating survey magnetic toolface based on the survey magnetometer readings and survey gravity toolface based on the survey accelerometer readings and determining an offset angle between the survey magnetic toolface and the survey gravity toolface; when the downhole probe assembly is rotating measuring magnetometer readings from the magnetometers at a predetermined sample point and calculating magnetic toolface at the predetermined sample point based on the magnetometer readings; determining gravity toolface at the predetermined sample point based on the calculated magnetic toolface and the offset angle; and comparing the gravity toolface at the predetermined sample point to the angle of rotation of the window at the predetermined sample point and resetting the angle of rotation of the window if the difference between the gravity toolface and the angle of rotation of the window at the predetermined sample point is above a threshold difference.

According to another aspect of the invention, there is provided a method of geosteering a drill bit downhole using a downhole probe assembly. The downhole probe assembly comprises: a gamma sensor module comprising a shield housing and a gamma sensor enclosed within the shield housing, the shield housing including a window exposing the gamma sensor therebelow; a gyroscope fixedly mounted in a plane perpendicular to an axis of rotation of the downhole probe assembly; and a controller in electrical communication with the gamma sensor module and the gyroscope. The method comprises:
  (a) rotating the downhole probe assembly;
  (b) measuring gamma radiation passing through the window and hitting the gamma sensor therebelow;
  (c) sampling gyroscope output at predetermined time intervals and determining speed of rotation of the downhole probe assembly for each sampled gyroscope output;
  (d) calculating a gyro angle for each sampled gyroscope output by multiplying the determined speed of rotation of the downhole probe assembly by the predetermined time interval;
  (e) calculating an angle of rotation of the window as an aggregate of the calculated gyro angles;
  (f) based on the calculated angle of rotation of the window allocating measured gamma radiation to one of a plurality of conceptual bins dividing each revolution of the downhole probe assembly;
  (g) recording the allocated measured gamma radiation for each of the plurality of bins for each revolution of the downhole probe assembly for a predetermined period;
  (h) recording the time the window spends in each of the plurality of bins for each revolution for the predetermined period;
  (i) calculating average gamma radiation for each of the plurality of bins for the predetermined period based on the allocated measured gamma radiation and the recorded time for each of the plurality of bins for each revolution;
  (j) transmitting selected parameters regarding the calculated average gamma radiation to the surface as telemetry data; and
  (j) geosteering the drill bit based on the transmitted telemetry data.

The predetermined period may be a predetermined amount of time or a predetermined number of revolutions of the downhole probe assembly. Alternatively, the predetermined period may be a predetermined amount of time and a shifting average may be taken whereby the average gamma radiation calculated for a latest portion of time replaces the average gamma radiation calculated for an equivalent oldest portion of time.

The selected parameters may comprise data regarding a minimum bin having lowest average gamma radiation over the predetermined period and data regarding a maximum bin having highest average gamma radiation over the predetermined period. The selected parameters may further comprise a ratio between the average gamma radiation of the maximum bin and the average gamma radiation of the minimum bin. The method may further comprise monitoring the ratio and signalling when the ratio is outside a predetermined range.

The method may further comprise: during periodic surveys when there is no rotation of the downhole probe assembly taking survey magnetometer and accelerometer readings respectively from magnetometers and accelerometers positioned in the downhole probe assembly and configured to gather information relating to each of orthogonal axes X, Y and Z; calculating survey magnetic toolface based on the survey magnetometer readings and survey gravity toolface based on the survey accelerometer readings and determining an offset angle between the survey magnetic toolface and the survey gravity toolface; when the downhole probe assembly is rotating measuring magnetometer readings from the magnetometers at a predetermined sample point and calculating magnetic toolface at the predetermined sample point based on the magnetometer readings; determining gravity toolface at the predetermined sample point based on the calculated magnetic toolface and the offset angle; and comparing the gravity toolface at the predetermined sample point to the angle of rotation of the window at the predetermined sample point and resetting the angle of rotation of the window if the difference between the gravity toolface and the angle of rotation of the window at the predetermined sample point is above a threshold difference.

According to another aspect of the invention, there is provided a downhole probe assembly comprising a gamma sensor module, a gyroscope and a controller in electrical communication with the gamma sensor module and the gyroscope. The gamma sensor module comprises a shield housing and a gamma sensor enclosed within the shield housing. The shield housing comprises a material that inhibits penetration of gamma radiation and includes a window exposing the gamma sensor therebelow such that gamma radiation emitted in the direction of the window is detected by the gamma sensor, whereby the window rotates about an axis of rotation of the downhole probe assembly when the downhole probe assembly is rotated downhole. The gyroscope is fixedly mounted in a plane perpendicular to the axis of rotation of the downhole probe assembly. The controller is configured to: sample gyroscope output at predetermined time intervals and determine the speed of rotation of the downhole probe assembly for each sampled gyroscope output; calculate a gyro angle for each sampled gyroscope output by multiplying the determined speed of rotation of the downhole probe assembly by the predetermined time interval; and calculate an angle of rotation of the window as an aggregate of the calculated gyro angles.

The gamma sensor may be eccentrically positioned within the shield housing towards the window to maximise thickness of the shield housing opposed to the window.

The gamma sensor module may further comprise an end cap fitted to one end of the shield housing. The end cap may be a male end cap or a female end cap configured to respectively mate with a female end cap or a male end cap of an axially adjacent module of the downhole probe assembly to physically and electrically interconnect the gamma sensor module with the adjacent module. The gamma sensor module may comprise the male end cap fitted to one end of the shield housing and the female end cap fitted to an opposed end of the shield housing.

The gyroscope may be fixedly mounted to a circuit board and the circuit board may be fixedly mounted in the plane perpendicular to the axis of rotation of the downhole probe assembly. The circuit board may be fixedly mounted to an end cap to form an end cap structure and the end cap structure may be fitted to housing of a module of the downhole probe assembly such that the circuit board is enclosed by the housing. The end cap structure may be a male end cap structure or a female end cap structure configured to respectively mate with a female end cap or a male end cap of an axially adjacent module of the downhole probe assembly to physically and electrically interconnect the module with the adjacent module. The end cap structure may be fitted to an end of the gamma sensor module.

DETAILED DESCRIPTION

The embodiments described herein generally relate to a method and apparatus for detecting gamma radiation downhole. Though the disclosed embodiments have application for a Measurement While Drilling (MWD) tool, the method and apparatus could also be used in any downhole probe assembly or tool used to detect gamma radiation downhole. The downhole probe assembly may also be used in a method of geosteering a drill bit downhole.

Apparatus Overview

Figure 1:
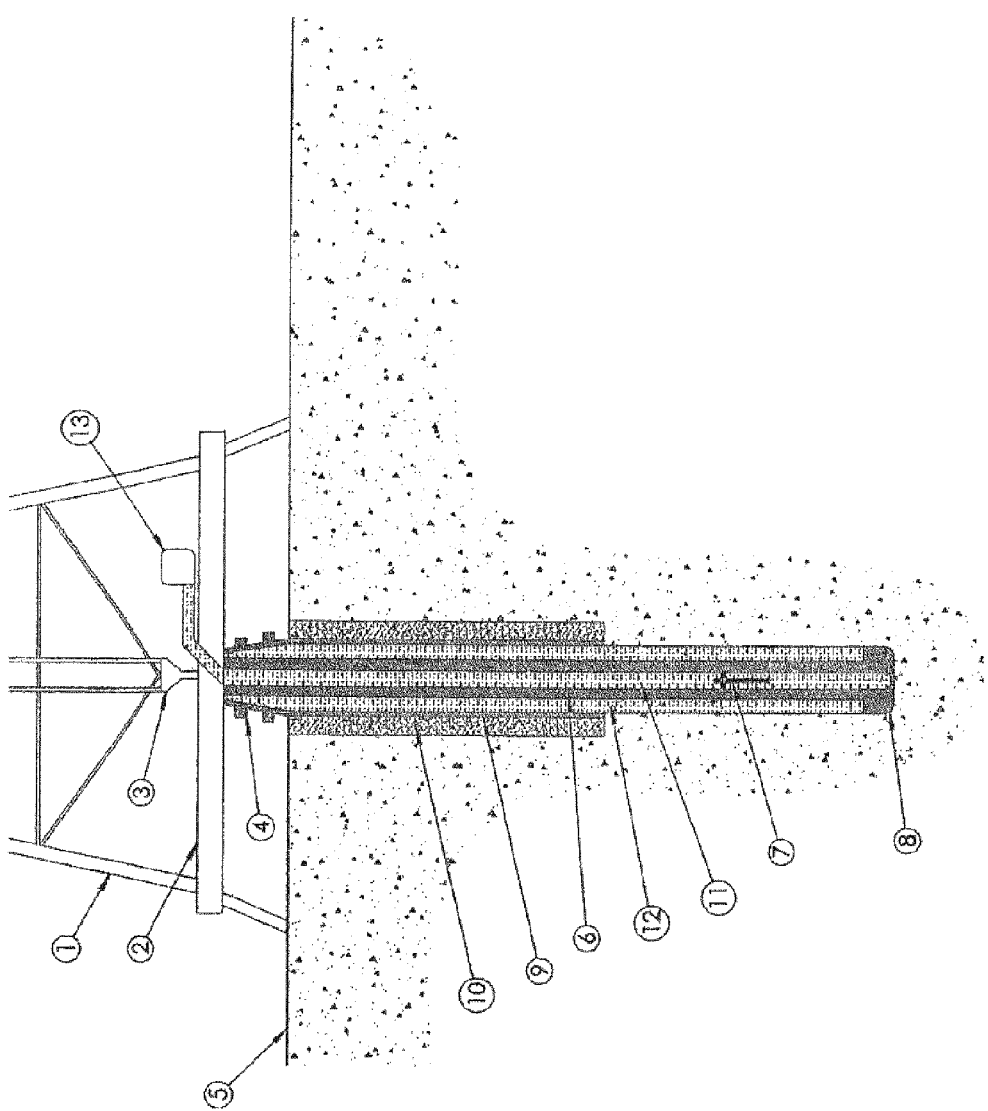
FIG. 1 is a schematic of a drill string in an oil and gas borehole including a downhole probe assembly in accordance with different embodiments.

Referring to the drawings and specifically to FIG. 1, there is shown a schematic representation of a downhole probe assembly 7 used in downhole drilling equipment in accordance with different embodiments. Downhole drilling equipment including a derrick 1 with a rig floor 2 and draw works 3 facilitate rotation of drill string 6 in the ground 5. The drill string 6 is enclosed in casing 9 which is fixed in position by casing cement 10. Bore drilling fluid 11 is pumped down drill string 6 by pump 13 and passes through downhole probe assembly 7 before reaching drill bit 8 at the end of the drill string 6. Annular drilling fluid 12 is then pumped back to the surface and passes through a blow out preventer (BOP) 4 positioned above the ground surface. The downhole probe assembly 7 may be a MWD tool 20 as shown in FIG. 2, however in alternative embodiments, the downhole probe assembly 7 may be any downhole probe that utilizes sensors.

Figure 2:
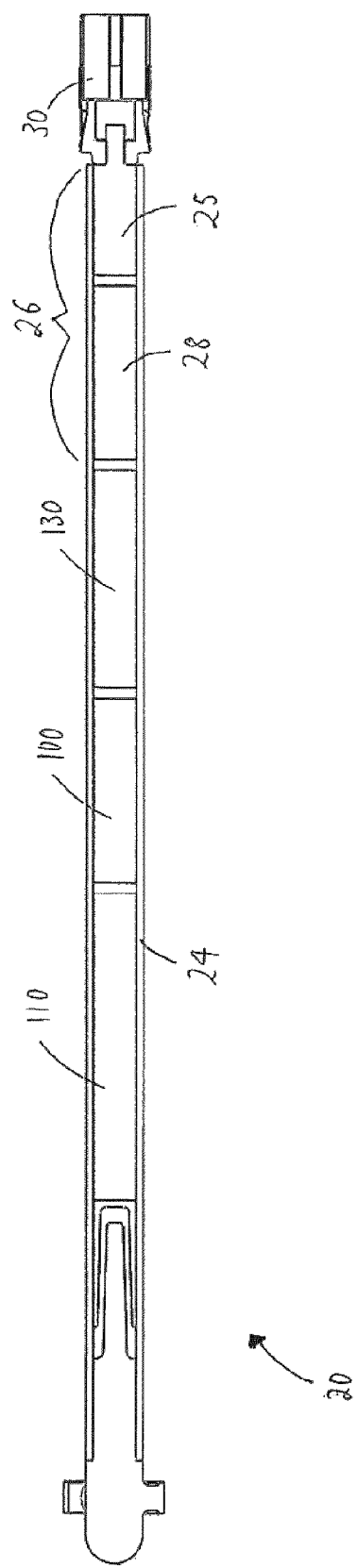
FIG. 2 is a schematic view of an MWD tool including a gamma sensor module and electronics subassembly in accordance with an embodiment.

Referring to FIG. 2, there is shown a schematic representation of the MWD tool 20. In the embodiment shown, the MWD tool 20 is used for mud pulse telemetry whereby a fluid pressure pulse is generated, however MWD tools may be configured for other telemetry methods, for example but not limited to an electromagnetic telemetry MWD tool. The MWD tool 20 is positioned within a drill collar of the drill string 6 and generally comprises a housing 24 enclosing a direction and inclination (D&I) sensor module 100, a gamma sensor module 130, a battery stack 110, and a pulser assembly 26. The pulser assembly 26 comprises an electronics subassembly 28 in electronic communication with a motor subassembly 25. The motor subassembly 25 drives a fluid pulse generator 30 to generate fluid pressure pulses which are transmitted to the surface and decoded. As would be apparent to a person of skill in the art, the arrangement of the modules of the MWD tool 20 may differ to the arrangement of the modules shown in the embodiment of FIG. 2.

Electronics Subassembly

Figure 3:
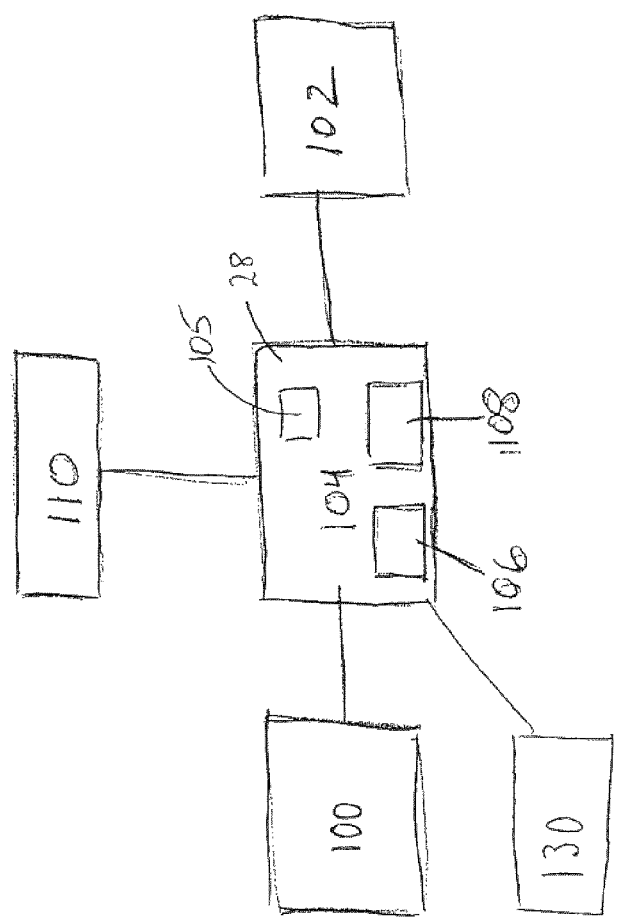
FIG. 3 is a schematic block diagram of components of the electronics subassembly and other components of the MWD tool.
Figure 4:
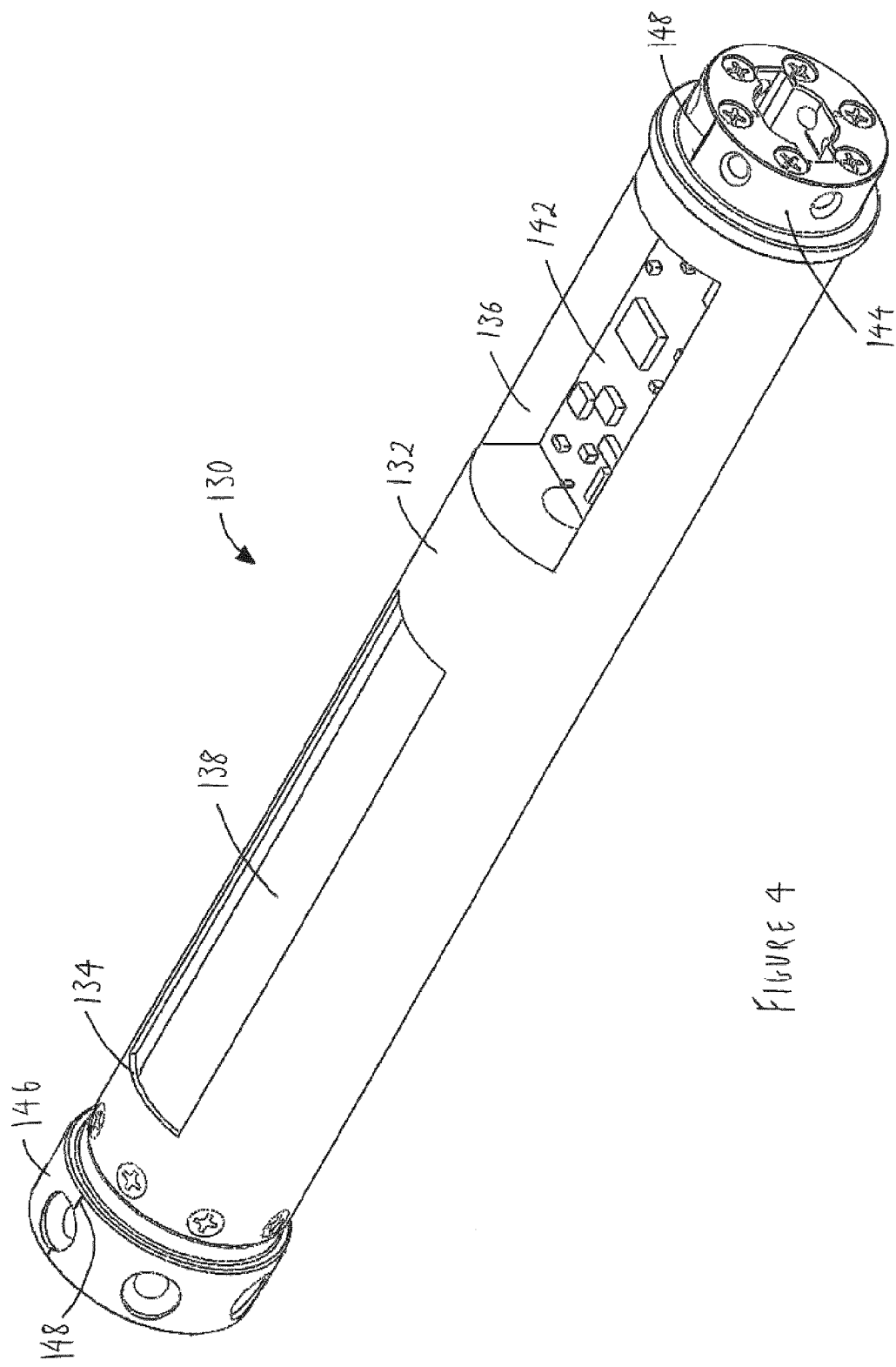
FIG. 4 is a perspective view of the gamma sensor module in accordance with an embodiment.
Figure 5:
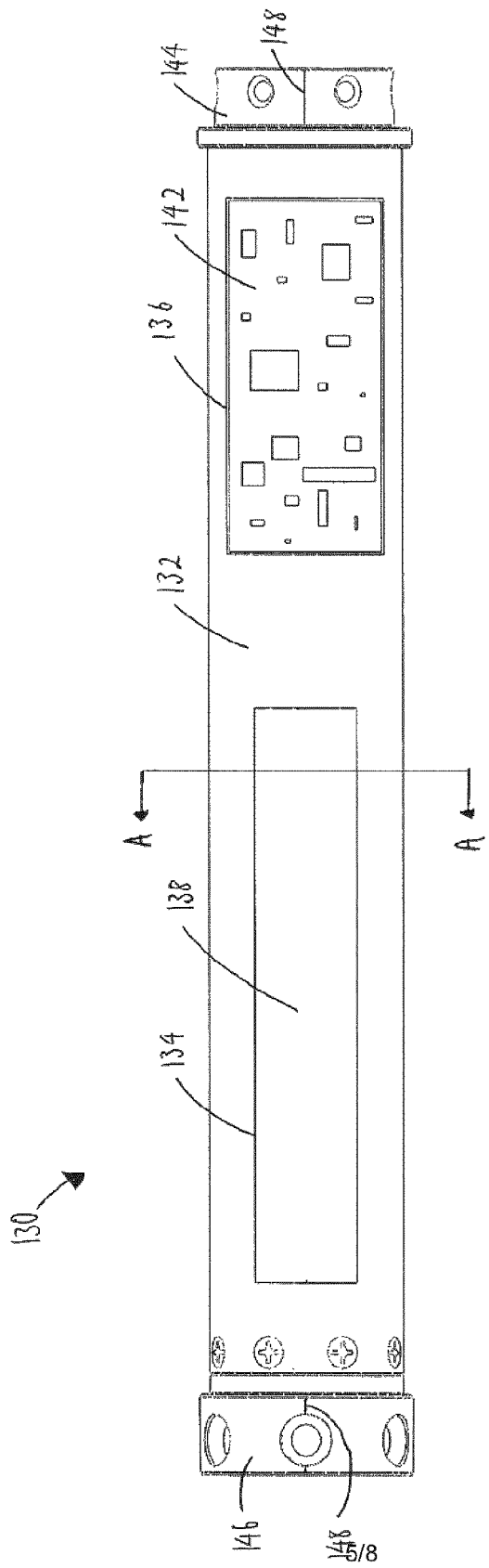
FIG. 5 is a top view of the gamma sensor module of FIG. 4.

Referring now to FIG. 3, the electronics subassembly 28 comprises a main circuit board 104 comprising a printed circuit board with electronic components soldered on the surface of the board. The main circuit board 104 contains a data encoder 105, a central processing unit (controller) 106 and a memory 108 having stored thereon program code executable by the controller 106 using power from the battery stack 110. The main circuit board 104 receives information regarding direction and inclination of the drill string 6 from the D&I sensor module 100, measurements of drilling conditions and gamma radiation from the gamma sensor module 130, as well as rotational information from a gyroscope 102 positioned within the MWD tool 20. More specifically, the D&I sensor module 100, the gamma sensor module 130 and the gyroscope 102 are each electrically communicative with the main circuit board 104 and send measurement data to the controller 106. The data encoder 105 encodes the information received and processed by the controller 106 into telemetry data. The controller 106 then sends control signals to the motor subassembly 25 to generate pressure pulses using the fluid pulse generator 30 corresponding to the telemetry data. In alternative embodiments, the controller 106 may send control signals for transmission of alternative telemetry data, such as EM telemetry data.

D&I Sensor Module

The D&I sensor module 100 includes D&I sensors comprising accelerometers to measure inclination and magnetometers to measure azimuth, as well as associated data acquisition and processing circuitry. For both the accelerometers and the magnetometers readings are taken which relate to each of the three orthogonal axes X, Y and Z, and these readings are sent to the controller 106 which uses calibration tables to factor in, for example temperature drift etc, to provide X, Y and Z readings. The X, Y and Z readings indicate the direction and inclination of the probe and this information is sent to the surface as telemetry data. The accelerometers and magnetometers are industry standard sensors which are known in the art and are therefore not described in further detail.

Gamma Sensor Module

Figure 6:
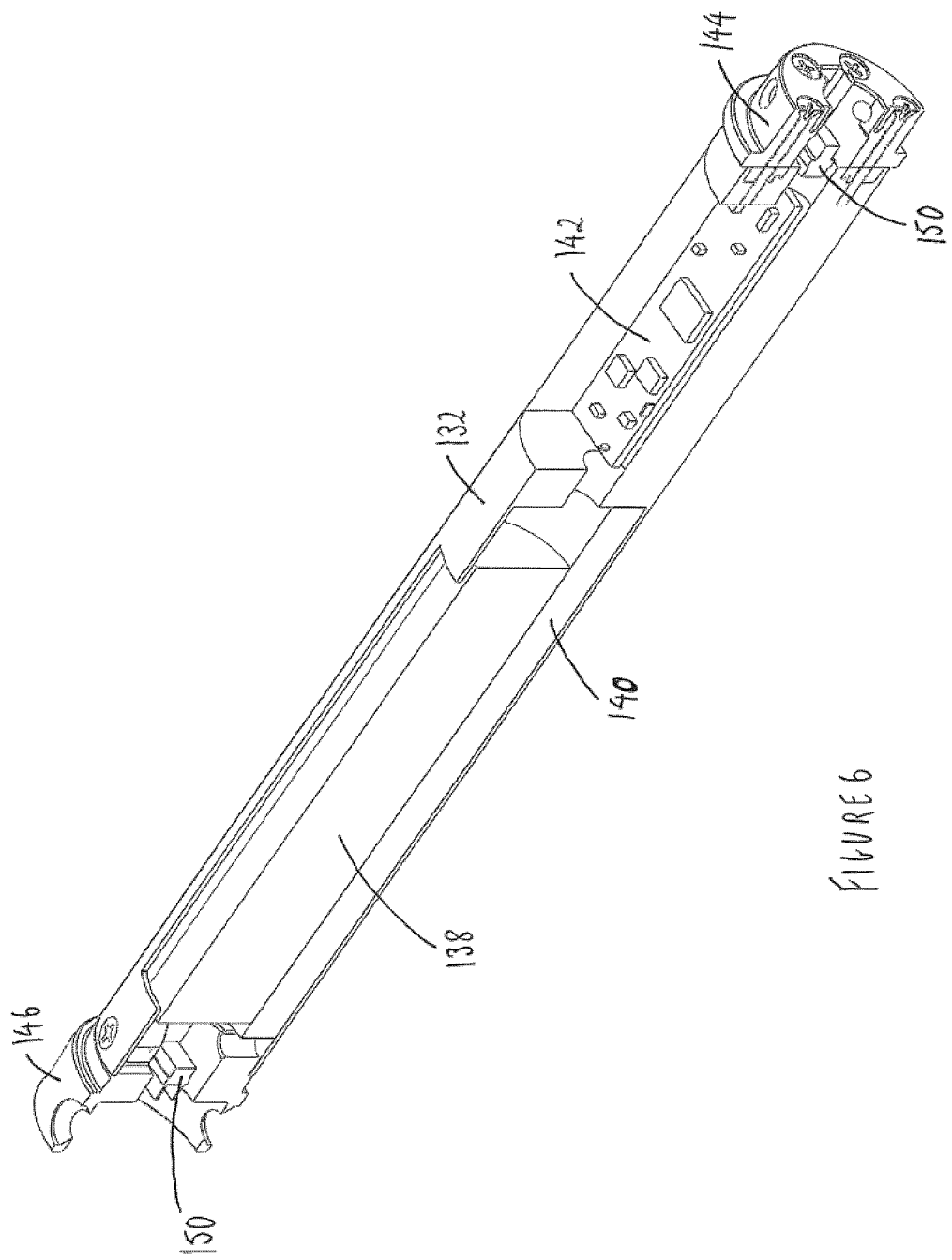
FIG. 6 is a perspective view of a longitudinal section of the gamma sensor module of FIG. 4.
Figure 7:
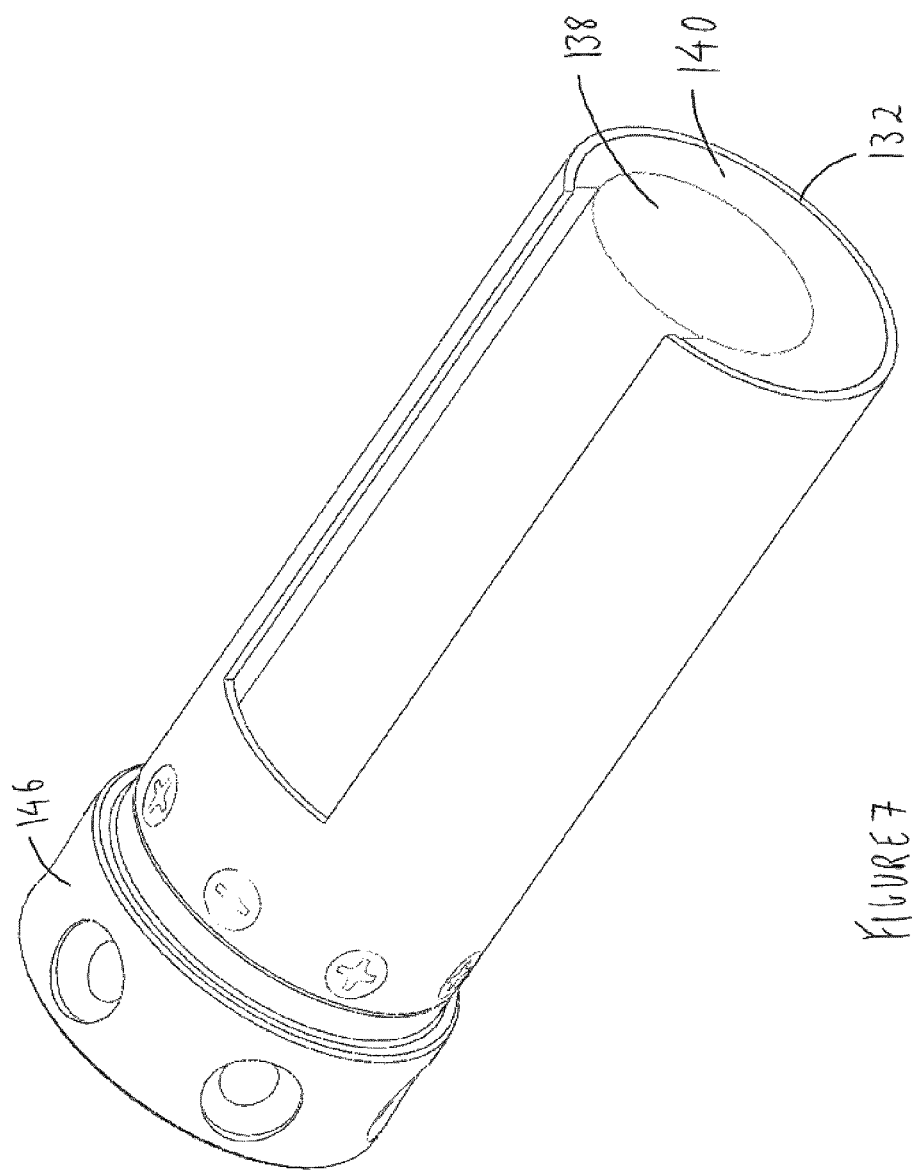
FIG. 7 is a perspective view of a cross-section of the gamma sensor module taken through line A-A of FIG. 5.

Referring now to FIGS. 4 to 7 the gamma sensor module 130 comprises a housing 132 with a bore passing through one half of the housing 132 and a depression 136 in the other half of the housing 132. Positioned within the bore is a cylindrical scintillation crystal 138 which scintillates in response to incident gamma radiation. The scintillation crystal 138 may be any known scintillation crystal which reacts in a predictable manner when exposed to incident gamma radiation, for example a thallium doped sodium iodide scintillation crystal. The high side of the housing 132 in the vicinity of the scintillation crystal 138 has a longitudinally elongated aperture or window 134 which exposes the scintillation crystal 138 positioned below. As shown in FIGS. 6 and 7, a high density shield 140 is positioned between the scintillation crystal 138 and the housing 132. The shield 140 may be composed of tungsten, carbide, lead or any material which is not easily penetrated by gamma radiation. The scintillation crystal 138 is eccentrically located within the housing 132 so as to maximise the thickness of the shield 140 and minimize penetration of gamma radiation therethrough. In the assembled MWD tool 20, tool housing 24 surrounds the gamma sensor module 130 and prevents the scintillation crystal 138 from coming into contact with drilling fluid or moisture which could damage the scintillation crystal 138.

A male end cap 144 is connected to one end of the housing 132 and a female end cap 146 is connected to the other end of the housing 132. As shown in FIG. 6, an electrical connector 150 is positioned in each of the male and female end caps 144, 146 for electrical connection with an axially adjacent module. The male end cap 144 and the female end cap 146 of the gamma sensor module 130 respectively mate with a corresponding female end cap and male end cap of the adjacent modules of the MWD tool 20 thereby physically and electrically interconnecting the gamma sensor module 130 with the adjacent modules. The end caps 144, 146 each have a high side line 148 which line up with a conceptual line passing longitudinally through the centre of the window 134. The high side lines 148 provide a means of lining up the high side of the gamma sensor module 130 with the high side of the adjacent modules when the MWD tool 20 is assembled.

A circuit board 142 seated in the depression 136 includes circuitry which collects gamma radiation measurements and transmit this data to the controller 106 in the electronics subassembly 28. The gamma sensor module 130 may also include sensors mounted on the circuit board 142, or communicative with the circuit board 142 for taking various measurements of borehole parameters and conditions such as temperature, pressure, and directional parameters. These measurements are also transmitted to the controller 106 for processing.

Gyroscope

Figure 8:
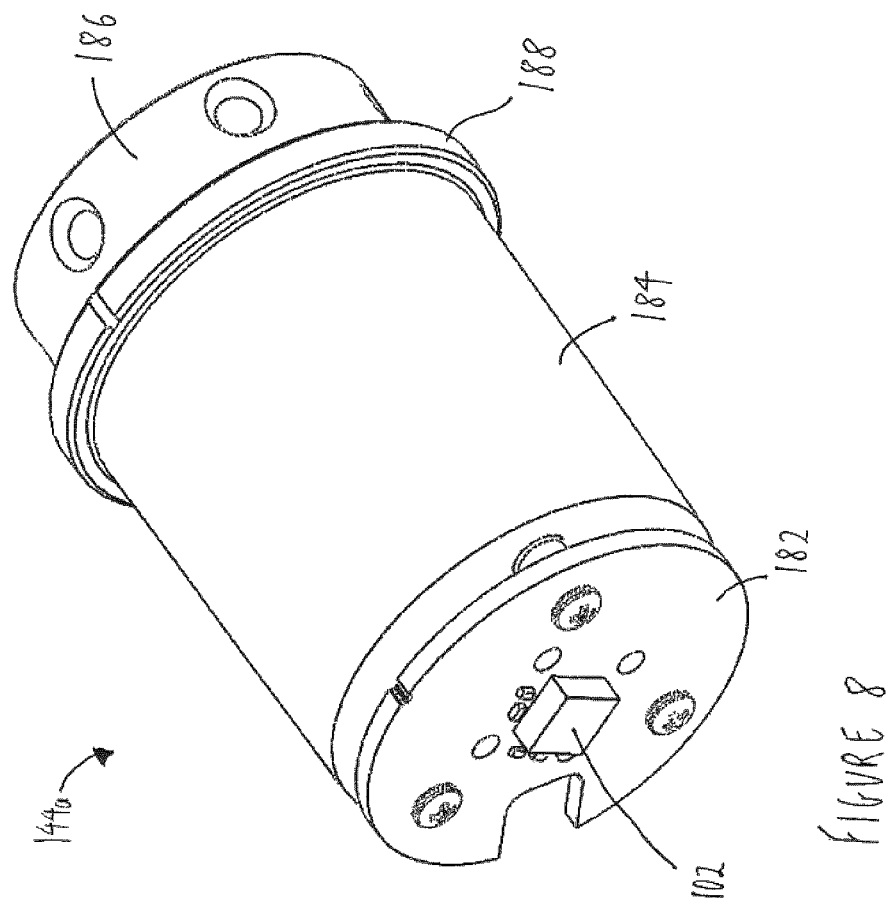
FIG. 8 is a perspective view of a male end cap structure including a gyroscope in accordance with an embodiment.

Referring now to FIG. 8, there is shown a male end cap structure 144a including a gyroscope 102 mounted on a circular circuit board 182. The male end cap structure 144a comprises a first section 184 and a second section 186 with an annular shoulder 188 separating the first and second sections. The first section 184 is dimensioned to fit inside housing of one of the modules of the MWD tool 20 with the housing abutting the annular shoulder 188. The second section 186 is dimensioned to mate with and fit inside a female end cap 146 of an adjacent module in the MWD tool 20 so as to physically and electrically interconnect the adjacent modules. The circuit board 182 is fixedly mounted to an end of the first section 184 perpendicular to the longitudinal axis of rotation of the MWD tool 20 and the gyroscope 102 is fixedly mounted in the center of the circuit board 182. When the male end cap structure 144a is fitted to one of the modules of the MWD tool 20, the gyroscope 102 is therefore positioned inside the module housing. The male end cap structure 144a may be fitted to the gamma sensor module 130, the D&I sensor module 100 or any other module in the MWD tool 20. In alternative embodiments, the gyroscope 102 may be fixedly mounted to a female end cap structure or to any other structure in the downhole probe assembly.

The gyroscope 102 may be a standard MEMS-based solid state gyroscope as is known in the art which measures rotation of the probe in one plane. More specifically, the gyroscope output voltage indicates the speed of rotation of the fixed circuit board 182 and thus the speed of rotation of the MWD tool 20 about the longitudinal axis of the MWD tool 20. The gyroscope 102 is therefore fixed relative to the window 134 of the gamma sensor module 130 and as such measures the speed of rotation of the window 134 about the longitudinal axis of the MWD tool 20. Measurements obtained by the gyroscope 102 are transmitted to the controller 106 in the electronics subassembly 28 for further processing.

Directional Gamma Sensing

The MWD tool 20 is used for directional gamma sensing downhole using an azimuthal binning method. More specifically, the 360 degree revolution of the MWD tool 7 is conceptually divided up into a number of bins or pie sections. Each pie section may have the same angular span, like the spokes of a wheel. For example, there may be 8 bins of 45 degrees each, 6 bins of 60 degrees each, or 12 bins of 30 degrees each and so on. More bins will provide greater accuracy for the directional gamma sensing, however the maximum number of bins may be limited by measurement hardware and economic constraints. As the gamma sensor module 130 rotates, the window 134 rotates through each of the conceptual bins in turn. Gamma radiation from the surrounding formation of the borehole emitted in the direction of the window 134 hits the scintillation crystal 138, whereas the shield 140 reduces or prevents penetration of gamma radiation emitted in the direction of the shield 140.

The gyroscope voltage output indicates the speed of rotation of the downhole probe assembly. Gyroscope output readings are sampled at predetermined time intervals, for example 100 readings per second which is one reading every 0.01 seconds. For each sampled reading the controller 106 calculates the angle of rotation for that time interval (gyro angle) using the following equation:

$$\text{gyro angle} = S \times T$$

where S is the speed of rotation given as degrees per second (for example 360 degrees per second) and T is the predetermined time interval (for example 0.01 second). Each newly calculated gyro angle is added to the running total of gyro angles to provide a real time indication of the angle of rotation of the MWD tool 20 and thus the angle of rotation of the window 134 (gyro angle of rotation). As the longitudinal centre of the gamma sensor window 134 is in line with the highside of the MWD tool 20, the controller 106 can determine when the longitudinal centre of the window 134 is entering and exiting each of the conceptual bins based on the gyro angle of rotation. The controller 106 records the time it takes for the window 134 to pass through each bin and gamma radiation emissions measured by the scintillation crystal 138 as the window 134 passes through a particular bin are allocated to that bin. In alternative embodiments, the controller may determine when the leading edge of the window 134, the trailing edge of the window 134 or any longitudinal axis of the window 134 is entering and exiting each bin.

The speed of rotation of the MWD tool 20 and thus of the gamma sensor module 130 varies depending on the rate of rotation per minute (RPM) of the drill string 6 set by the operator as well as conditions downhole which can speed up or slow down the rate of penetration of the drill bit 8 and thus the rate of rotation of the MWD tool 20. The time the window 134 spends in each bin therefore varies depending on the speed of rotation at that time. In order to accurately compare the gamma counts for each bin, the time the window 134 spends in each bin as well as the number of gamma counts measured as the window 134 passes through each bin is recorded for each rotation over a specified time period (for example 90 seconds) or for a specific number of rotations of the MWD tool 20 (for example 90 rotations). The controller 106 then calculate the average number of gamma counts per second for each bin over the specified time period or for the specified number of rotations of the MWD tool 20.

The calculated gyro angle of rotation may drift over time from the true angle of rotation, because the gyro angle of rotation is based on an aggregate total of gyro angles and small errors in the gyro angle calculations may be magnified over time. Readings from the D&I sensors of the D&I sensor module 100 can be used to check and reset the gyro angle of rotation if needed. The magnetometers provide an indication of the magnetic toolface (i.e. tool highside orientation relative to magnetic north) and the accelerometers provide an indication of the gravity toolface (i.e. tool highside orientation relative to the highside of the borehole) as is known in the art. During rotational drilling it is not possible to get accurate, instantaneous accelerometer readings, as the accelerometers are too sensitive to vibration to provide an accurate reading. Magnetometer readings can be taken during rotational drilling, however they provide an indication of magnetic toolface whereas the controller needs to know gravity toolface in order to check the gyro angle of rotation. Readings are therefore taken from the magnetometers and accelerometers during periodic surveys when drilling is stopped, and an offset angle between gravity toolface and magnetic toolface is determined by the controller 106. This offset angle is stable provided the inclination and azimuth of the MWD tool 20 are not changing substantially in-between surveys and may be used to calculate gravity toolface from the determined magnetic toolface as discussed below.

Magnetometer readings are taken during rotational drilling. In one embodiment, the controller 106 calculates magnetic toolface (mag angle) based on $M_y$ and $M_x$, where $M_y$ and $M_x$ are magnetometer readings taken from magnetometers in the two orthogonal axis which are lateral to the longitudinal axis of rotation of the MWD tool 20 (i.e. the x axis and the y axis). $M_{lateral}$ is a projection of the magnetic field onto the $M_y$ and $M_x$ plane and is also lateral to the longitudinal axis of the MWD tool 20. The magnetic toolface (mag angle) is the orientation of $M_{lateral}$ in the x and y plane. The mag angle may be calculated from simultaneously taken $M_y$ and $M_x$ readings using the following equation:

$$\text{mag angle} = \tan^{-1} M_y/M_x$$

When the highside of the MWD tool 20 is oriented at magnetic north, $M_y$ is zero, $M_x = M_{lateral}$ and the mag angle is zero. As the MWD tool 20 rotates, the mag angle can be calculated using the equation given above to indicate the magnetic toolface at any given point in time. Other ways of calculating magnetic toolface from the magnetometer readings may be utilized as would be apparent to a person of skill in the art. The offset angle discussed above can then be added to or subtracted from the mag angle as appropriate to determine gravity toolface.

In one embodiment, the mag angle is calculated at set times during each revolution of the MWD tool 20. For example the mag angle may be calculated once per revolution when the gyro angle of rotation is zero indicating that the central point of the window 134 should be orientated towards the highside of the borehole. Gravity toolface is determined from the calculated mag angle and compared to the gyro angle of rotation. If the difference between gravity toolface and the gyro angle of rotation is greater than a predetermined threshold amount (for example greater than 5 degrees or greater than 10 degrees) this indicates that the calculated gyro angle of rotation has drifted over time and the gyro angle of rotation is reset to correspond with gravity toolface. Once gravity toolface and the gyro angle of rotation are the same, the azimuthal binning method can resume.

The gyroscope 102 allows high frequency sampling of rotational data, for example the gyroscope output voltage can be sampled 100 times per second or more. This enables the controller 106 to determine at high frequency, and in real time, the angle of rotation of the window 134 of the gamma sensor module 130. The gamma counts can therefore be accurately assigned to the correct bin and the time taken for the window 134 to move through each bin can be accurately measured. The magnetometer readings may be sampled less frequently than the gyroscope readings and are used to check that the gyro angle of rotation has not drifted from the true angle of rotation.

The gyroscope 102 may be calibrated during periodic surveys when the drilling is stopped to ensure that the gyroscope voltage output is zero when there is no rotation of the MWD tool 20. The magnetometers and accelerometers may also be calibrated during periodic surveys as is known in the art.

The azimuthal binning method may utilize a shifting averaging frame to provide a running average number of counts per second for each bin. For example, a 10 second average time frame may be used in which the gamma counts for the latest 1 second period are added to the total and the gamma counts from the oldest 1 second period are removed from the total, and the average taken for that 10 second time frame. Each 10 second time frame includes the latest 1 second gamma counts replacing the oldest 1 second gamma counts to provide a shifting 10 second average. The length of the average time frame may be set depending on downhole conditions and operational requirements.

When the directional gamma sensing is carried out downhole it generates a large amount of data. Data regarding the average number of gamma counts per second for each bin over a specific time period or for a specific number of rotations may be stored in the memory 108 of the electronics subassembly 28, and can be analyzed by the operator when the MWD tool 20 is brought uphole. It is generally not possible or desirable however, to send all this data to the surface in real time as telemetry data. Parameters are therefore selected to send to the surface. For example, telemetry data sent to the surface may include data relating to the position and average gamma counts per second for the bins giving the maximum and minimum gamma counts per second. The minimum gamma count bin is generally directly opposite the maximum gamma count bin. The controller 106 may also calculate the ratio between the average gamma counts per second for the maximum and minimum bins (max/min gamma count ratio) and send this data to the surface at timed intervals, for example every 10 seconds or more or less depending on drilling conditions or telemetry rates. If the max/min gamma count ratio is within a predetermined range, this generally indicates that the gamma count is relatively consistent for all bins and the borehole is correctly positioned in or near the center of the zone of interest. If the max/min gamma count ratio increases above a predetermined amount, a signal may be sent to the surface to warn the operator that the drill bit 8 may be approaching a zone (shale) boundary. The operator can then assess the data provided regarding the direction of the maximum and minimum gamma count bins and steer the drill bit 8 away from the source of gamma emissions (i.e. away from the direction of the maximum gamma count bin and towards the direction of the minimum gamma count bin). If the max/min gamma count ratio increases and then decreases, this may indicate that the drill bit 8 has passed into the zone (shale) boundary or has gone through it as the max and min gamma counts will even out again when the gamma sensor is surrounded by the shale boundary, albeit at a higher gamma counts per second than when the drill bit 8 is in the middle of the zone of interest. In alternative embodiments, different parameters may be sent to the surface as telemetry data representative of the directional gamma sensing being carried out downhole.

The azimuthal binning method of the embodiments described herein allow the operator to carry out downhole formation evaluations and changing boundary evaluations while the drill bit 8 is rotating downhole. The information can be used for real time geosteering to keep the drill bit 8 in the pay zone of interest and away from zone boundaries. If increased gamma emissions are sensed, the binning method provides an indication of whether the drill bit 8 is drilling up towards the upper shale boundary or down towards the lower shale boundary.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

The invention claimed is:

1. A method for detecting gamma radiation downhole using a downhole probe assembly comprising:
   a gamma sensor module comprising a shield housing and a gamma sensor enclosed within the shield housing, the shield housing including a window exposing the gamma sensor therebelow;
   a gyroscope fixedly mounted in a plane perpendicular to an axis of rotation of the downhole probe assembly; and
   a controller in electrical communication with the gamma sensor module and the gyroscope;
the method comprising:
   (a) rotating the downhole probe assembly;
   (b) measuring gamma radiation passing through the window and hitting the gamma sensor therebelow;
   (c) sampling gyroscope output at predetermined time intervals and determining speed of rotation of the downhole probe assembly for each sampled gyroscope output;
   (d) calculating a gyro angle for each sampled gyroscope output by multiplying the determined speed of rotation of the downhole probe assembly by the predetermined time interval;
   (e) calculating an angle of rotation of the window as an aggregate of the calculated gyro angles; and
   (f) based on the calculated angle of rotation of the window allocating measured gamma radiation to one of a plurality of conceptual bins dividing each revolution of the downhole probe assembly.

2. The method of claim 1, further comprising:
   (g) recording the allocated measured gamma radiation for each of the plurality of bins for each revolution of the downhole probe assembly for a predetermined period;
   (h) recording the time the window spends in each of the plurality of bins for each revolution for the predetermined period; and
   (i) calculating average gamma radiation per unit of time for each of the plurality of bins for the predetermined period based on the allocated measured gamma radiation and the time the window spends in each of the plurality of bins for each revolution.

3. The method of claim 2, wherein the predetermined period is a predetermined amount of time or a predetermined number of revolutions of the downhole probe assembly.

4. The method of claim 2, wherein the predetermined period is a predetermined amount of time and a shifting average is taken whereby the average gamma radiation calculated for a latest portion of time replaces the average gamma radiation calculated for an equivalent oldest portion of time.

5. The method of claim 2, further comprising transmitting selected parameters regarding the calculated average gamma radiation for each of the plurality of bins for the predetermined period to the surface as telemetry data.

6. The method of claim 5, wherein the selected parameters comprise data regarding a minimum bin having lowest average gamma radiation over the predetermined period and data regarding a maximum bin having highest average gamma radiation over the predetermined period.

7. The method of claim 6, wherein the selected parameters further comprise a ratio between the average gamma radiation of the maximum bin and the average gamma radiation of the minimum bin.

8. The method of claim 7, further comprising monitoring the ratio and signalling when the ratio is outside a predetermined range.

9. The method of claim 1, further comprising:
during periodic surveys when there is no rotation of the downhole probe assembly taking survey magnetometer and accelerometer readings respectively from magnetometers and accelerometers positioned in the downhole probe assembly and configured to gather information relating to each of orthogonal axes X, Y and Z;
calculating survey magnetic toolface based on the survey magnetometer readings and survey gravity toolface based on the survey accelerometer readings and determining an offset angle between the survey magnetic toolface and the survey gravity toolface;
when the downhole probe assembly is rotating measuring magnetometer readings from the magnetometers at a predetermined sample point and calculating magnetic toolface at the predetermined sample point based on the magnetometer readings;
determining gravity toolface at the predetermined sample point based on the calculated magnetic toolface and the offset angle; and
comparing the gravity toolface at the predetermined sample point to the angle of rotation of the window at the predetermined sample point and resetting the angle of rotation of the window if the difference between the gravity toolface and the angle of rotation of the window at the predetermined sample point is above a threshold difference.

10. A method of geosteering a drill bit downhole using a downhole probe assembly comprising:
a gamma sensor module comprising a shield housing and a gamma sensor enclosed within the shield housing, the shield housing including a window exposing the gamma sensor therebelow;
a gyroscope fixedly mounted in a plane perpendicular to an axis of rotation of the downhole probe assembly; and
a controller in electrical communication with the gamma sensor module and the gyroscope;
the method comprising:
(a) rotating the downhole probe assembly;
(b) measuring gamma radiation passing through the window and hitting the gamma sensor therebelow;
(c) sampling gyroscope output at predetermined time intervals and determining speed of rotation of the downhole probe assembly for each sampled gyroscope output;
(d) calculating a gyro angle for each sampled gyroscope output by multiplying the determined speed of rotation of the downhole probe assembly by the predetermined time interval;
(e) calculating an angle of rotation of the window as an aggregate of the calculated gyro angles;
(f) based on the calculated angle of rotation of the window allocating measured gamma radiation to one of a plurality of conceptual bins dividing each revolution of the downhole probe assembly;
(g) recording the allocated measured gamma radiation for each of the plurality of bins for each revolution of the downhole probe assembly for a predetermined period;
(h) recording the time the window spends in each of the plurality of bins for each revolution for the predetermined period;
(i) calculating average gamma radiation for each of the plurality of bins for the predetermined period based on the allocated measured gamma radiation and the recorded time for each of the plurality of bins for each revolution;
(j) transmitting selected parameters regarding the calculated average gamma radiation to the surface as telemetry data; and
(j) geosteering the drill bit based on the transmitted telemetry data.

11. The method of claim 10, wherein the predetermined period is a predetermined amount of time or a predetermined number of revolutions of the downhole probe assembly.

12. The method of claim 10, wherein the predetermined period is a predetermined amount of time and a shifting average is taken whereby the average gamma radiation calculated for a latest portion of time replaces the average gamma radiation calculated for an equivalent oldest portion of time.

13. The method of claim 10, wherein the selected parameters comprise data regarding a minimum bin having lowest average gamma radiation over the predetermined period and data regarding a maximum bin having highest average gamma radiation over the predetermined period.

14. The method of claim 13 wherein the selected parameters further comprise a ratio between the average gamma radiation of the maximum bin and the average gamma radiation of the minimum bin.

15. The method of claim 14, further comprising monitoring the ratio and signalling when the ratio is outside a predetermined range.

16. The method of claim 10, further comprising:
during periodic surveys when there is no rotation of the downhole probe assembly taking survey magnetometer and accelerometer readings respectively from magnetometers and accelerometers positioned in the downhole probe assembly and configured to gather information relating to each of orthogonal axes X, Y and Z;
calculating survey magnetic toolface based on the survey magnetometer readings and survey gravity toolface based on the survey accelerometer readings and determining an offset angle between the survey magnetic toolface and the survey gravity toolface;
when the downhole probe assembly is rotating measuring magnetometer readings from the magnetometers at a predetermined sample point and calculating magnetic toolface at the predetermined sample point based on the magnetometer readings;
determining gravity toolface at the predetermined sample point based on the calculated magnetic toolface and the offset angle; and
comparing the gravity toolface at the predetermined sample point to the angle of rotation of the window at the predetermined sample point and resetting the angle of rotation of the window if the difference between the gravity toolface and the angle of rotation of the window at the predetermined sample point is above a threshold difference.

17. A downhole probe assembly comprising:
(a) a gamma sensor module comprising a shield housing and a gamma sensor enclosed within the shield housing, the shield housing comprising a material that inhibits penetration of gamma radiation and including a window exposing the gamma sensor therebelow such that gamma radiation emitted in the direction of the window is detected by the gamma sensor, whereby the window rotates about an axis of rotation of the downhole probe assembly when the downhole probe assembly is rotated downhole;
(b) a gyroscope fixedly mounted in a plane perpendicular to the axis of rotation of the downhole probe assembly, the gyroscope configured to measure speed of rotation of the downhole probe assembly; and
(c) a controller in electrical communication with the gamma sensor module and the gyroscope, the controller configured to:
sample gyroscope output at predetermined time intervals and determine the speed of rotation of the downhole probe assembly for each sampled gyroscope output;
calculate a gyro angle for each sampled gyroscope output by multiplying the determined speed of rotation of the downhole probe assembly by the predetermined time interval; and
calculate an angle of rotation of the window as an aggregate of the calculated gyro angles.

18. The downhole probe assembly of claim 17, wherein the gamma sensor is eccentrically positioned within the shield housing towards the window to maximise thickness of the shield housing opposed to the window.

19. The downhole probe assembly of claim 17, wherein the gamma sensor module further comprises an end cap fitted to one end of the shield housing, the end cap being a male end cap or a female end cap configured to respectively mate with a female end cap or a male end cap of an axially adjacent module of the downhole probe assembly to physically and electrically interconnect the gamma sensor module with the adjacent module.

20. The downhole probe assembly of claim 19, wherein the gamma sensor module comprises the male end cap structure fitted to one end of the shield housing and the female end cap structure fitted to an opposed end of the shield housing.

21. The downhole probe assembly of claim 17, wherein the gyroscope is fixedly mounted to a circuit board and the circuit board is fixedly mounted in the plane perpendicular to the axis of rotation of the downhole probe assembly.

22. The downhole probe assembly of claim 21, wherein the circuit board is fixedly mounted to an end cap to form an end cap structure and the end cap structure is fitted to housing of a module of the downhole probe assembly such that the circuit board is enclosed by the housing, wherein the end cap structure is a male end cap structure or a female end cap structure configured to respectively mate with a female end cap or a male end cap of an axially adjacent module of the downhole probe assembly to physically and electrically interconnect the module with the adjacent module.

23. The downhole probe assembly of claim 22, wherein the end cap structure is fitted to an end of the gamma sensor module.

* * * * *